United States Patent
Moorkanikara Nageswaran et al.

(10) Patent No.: US 7,769,937 B2
(45) Date of Patent: Aug. 3, 2010

(54) DATA PROCESSING SYSTEM WITH INTERRUPT CONTROLLER AND INTERRUPT CONTROLLING METHOD

(75) Inventors: Jayram Moorkanikara Nageswaran, Irvine, CA (US); Paul Stravers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 155 days.

(21) Appl. No.: 11/817,057

(22) PCT Filed: Feb. 21, 2006

(86) PCT No.: PCT/IB2006/050556

§ 371 (c)(1),
(2), (4) Date: Aug. 24, 2007

(87) PCT Pub. No.: WO2006/090329

PCT Pub. Date: Aug. 31, 2006

(65) Prior Publication Data

US 2008/0168203 A1    Jul. 10, 2008

(30) Foreign Application Priority Data

Feb. 28, 2005    (EP) .................................. 05101495

(51) Int. Cl.
*G06F 13/26* (2006.01)
(52) U.S. Cl. ................. 710/264; 710/268; 710/269; 710/243
(58) Field of Classification Search ................. 710/243, 710/264, 268, 269
See application file for complete search history.

(56) References Cited

U.S. PATENT DOCUMENTS

| | | | |
|---|---|---|---|
| 5,134,706 A | | 7/1992 | Cushing et al. |
| 5,287,523 A | * | 2/1994 | Allison et al. ................. 710/50 |
| 5,530,875 A | * | 6/1996 | Wach ......................... 710/264 |
| 5,594,905 A | * | 1/1997 | Mital ......................... 710/260 |
| 5,613,128 A | | 3/1997 | Nizar et al. |
| 5,671,421 A | | 9/1997 | Kardach et al. |
| 5,752,043 A | * | 5/1998 | Suzuki ....................... 710/264 |
| 5,832,278 A | * | 11/1998 | Pham ......................... 710/243 |
| 5,928,348 A | * | 7/1999 | Mukai et al. ................. 710/263 |
| 6,115,778 A | * | 9/2000 | Miyake et al. ............... 710/260 |
| 6,618,780 B1 | * | 9/2003 | Popat ......................... 710/264 |
| 6,681,281 B1 | * | 1/2004 | Maleck ....................... 710/261 |
| 6,742,065 B1 | | 5/2004 | Suh |

(Continued)

*Primary Examiner*—Mark Rinehart
*Assistant Examiner*—Nimesh G Patel

(57) ABSTRACT

A data processing system includes a first interrupt controller with an interrupt source interface, an interrupt controller interface, a prioritizer, and an interrupt controller output. The data processing system further includes a processing unit providing an interrupt controller interface. Interrupt requests generated by a first plurality of interrupt sources, a second selected interrupt request, a second priority signal, and a second interrupt source index signal generated by a second interrupt controller are received by the first interrupt controller. From the plurality of interrupt requests and the second selected interrupt request, a first single interrupt request is selected and transmitted to the processing unit along with a first priority signal, and a first index signal. The processing unit initiates an appropriate interrupt service routine on the basis of said first index signal.

12 Claims, 3 Drawing Sheets

U.S. PATENT DOCUMENTS

Figure 1:
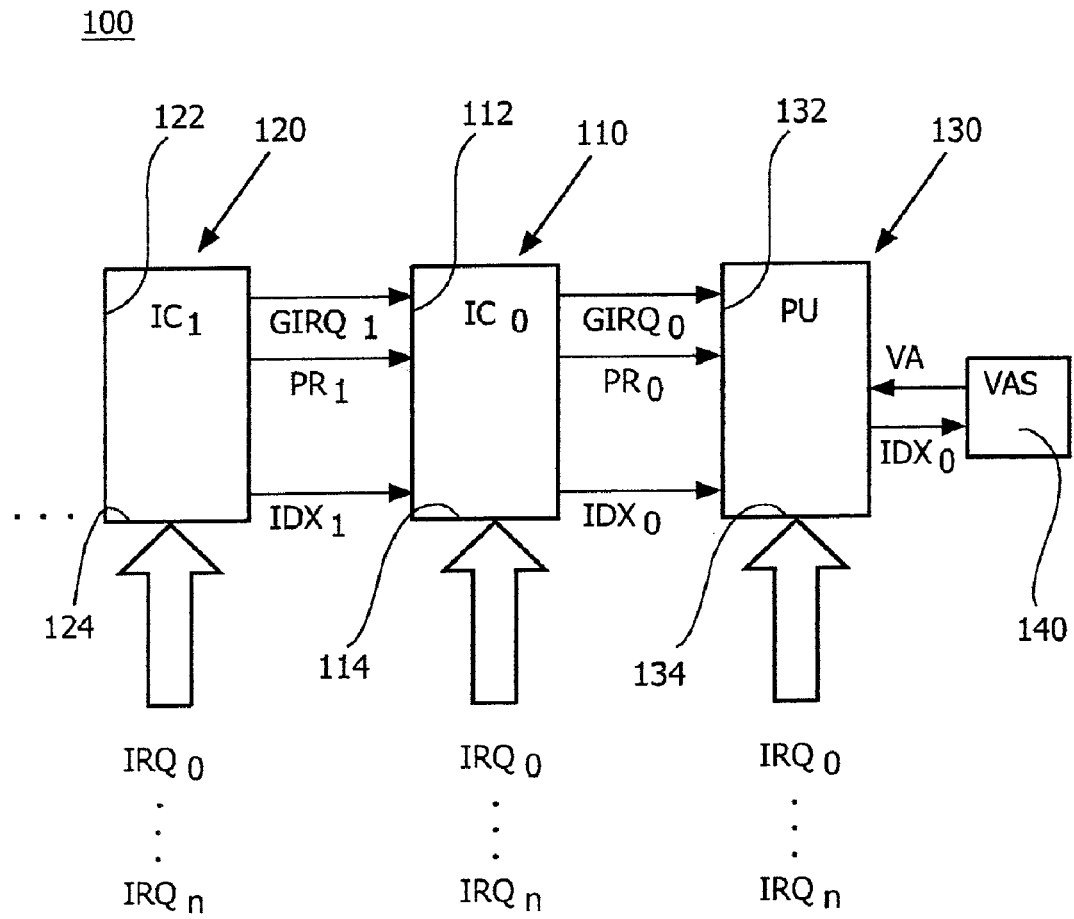

| | | |
|---|---|---|
| 2003/0105798 A1 | 6/2003 | Kim et al. |
| 2003/0172215 A1 | 9/2003 | Franke et al. |
| 2003/0204655 A1 | 10/2003 | Schmisseur et al. |
| 2004/0054832 A1 | 3/2004 | Franke et al. |
| 2004/0153596 A1 | 8/2004 | Monteiro |
| 2004/0199694 A1 | 10/2004 | Yiu et al. |

* cited by examiner

DATA PROCESSING SYSTEM WITH INTERRUPT CONTROLLER AND INTERRUPT CONTROLLING METHOD

The present invention relates to a data processing system comprising an interrupt controller (IC) for handling of multiple interrupt requests (IRQs) issued to a processor or processing unit (PU, CPU, core) of the data processing system at the same time. The invention is also related to a method for handling such interrupt requests according to a determined scheme in order to assure prioritized execution of appropriate interrupt service routines (ISR).

When devices, e.g. hardware devices within the data processing system, together on the same chip with the processing unit, or off-chip hardware devices, require a processing unit within the data processing system to perform a service routine they will typically issue an interrupt request to the processing unit. When such an interrupt request is received by the processing unit whilst this processing unit is executing another process, the processing unit will typically temporarily interrupt this other process under execution, and instead execute the interrupt service routine specified by the interrupt request.

Many built-in hardware mechanisms exist for efficiently working with interrupt based schemes, like simple interrupt masking, priority based masking, and automatic vectored interrupt handling. However, there is a restriction on the number of interrupt requests, which can be served by the processing unit. For example, MIPS can only serve six interrupt requests, TM2 can serve 32 interrupt requests and TM3260 can serve 64 interrupt requests.

However, in multi-processor systems or a highly integrated system-on-chip (SoC), for example, a large number of functional hardware devices (HW IPs), several main processor cores are integrated and further peripheral hardware IPs are connected. Such functional HW IPs like MPEG-2-decoder, network processor, crypto-processor, etc., mainly used for delivering specific functionality in the SoC and the peripheral hardware IPs need to communicate to a particular processor core. Furthermore, inter-processor communication is going to be established. Most of the SoCs like PNX8525 from Philips Semiconductors, OMAP from Texas Instruments, etc. have several dozens of hardware IP blocks, totally requiring more interrupt request lines than supported by the processing unit. In order to support a large number of interrupting devices, interrupt controllers (ICs) or generic interrupt controllers (GICs) are employed within such multi-processor systems or SoCs.

The interrupt controller typically multiplexes all incoming interrupt requests and sends the interrupt requests having the highest priority to the processing unit. The processing unit then reads the source of the interrupt requests delivered by the interrupt controller. In particular, in common SoC architectures, the processing unit reads the index of the highest priority interrupt delivered by the interrupt controller executing an external MMIO (Memory mapped input/output operation, i.e. the internal registers of the interrupt controller, like priority registers, are accessed by simple load/store instructions executed by the processing unit). This step, however, takes approximately between 15 and 30 cycles or more, and hence, increases the interrupt latency, i.e. the time between initiating an interrupt request and the beginning of the corresponding interrupt service routine executed by the processing unit.

In order to reduce the interrupt latency in a SoC, a hardware identification solution called vectorized interrupts are handled by vectorized interrupt controllers (VICs). The vectorized interrupt controller provides besides the interrupt request an interrupt vector containing the address of the required interrupt service routine. In particular, each interrupting device supplies an identification number to the interrupt controller. The identification number can be used by the interrupt controller in conjunction with a look-up table (the interrupt vector table) to determine the address of the interrupt service routine. This interrupt vector is delivered to the processing unit. In other words, when an interrupt request is received, the interrupt controller can pass the exact location of the associated interrupt service routine to the processor to enable the processor to begin execution of said service routine.

However, along with an increasing number of hardware IPs also an increased number of interrupt requests is generated which cannot be handled by single vectorized interrupt controller. For handling also a larger amount of interrupt requests a daisy chain consisting of several cascaded interrupt controllers has been developed.

An example of a cascade of vectorized interrupt controllers is disclosed in US 2004/0199694 A1. According to this document, the interrupt controller comprises an interrupt source interface operable to receive interrupt requests generated by a plurality of interrupt sources, a daisy chain interface operable to receive a daisy chain interrupt request output by a preceding interrupt controller based on interrupt requests generated by another plurality of interrupt sources. The daisy chain interface includes a priority input for receiving a daisy chain priority signal indicating a priority associated with a daisy chain interrupt request. The interrupt controller further comprises a prioritization logic operable to determine the highest priority interrupt request received from both the daisy chain interrupt request and any interrupt request received directly via the interrupt source interface. An output interface includes a priority output operable to provide an output priority signal indicating a priority associated with the highest priority interrupt request, thereby enabling this priority information to be propagated to any other interrupt controller higher in the daisy chain.

The interrupt controllers proposed by US 2004/0199694 are vectorized interrupt controllers further comprising an interrupt vector table for storing for each of the interrupt request an associated vector address identifying an interrupt routine. The daisy chain interface therefore includes a vector address input operable to receive a daisy chain vector address signal indicating a daisy chain vector address associated with a daisy chain interrupt request. And the output interface includes a vector address output operable to provide an output vector address signal indicating an output vector address associated with the highest priority interrupt request. This output vector address signal along with the interrupt request is transmitted to the processing unit in order to initiate the interrupt service routine associated with the particular requesting interrupt source.

However, for most of the interrupt sources the interrupt handling is a two step operation. First, during an interrupt operation a default interrupt handler or routine is called. Then the default interrupt handler jumps to the service routine of the actual interrupting source. This means, passing on the interrupt vector which is usually a long word (may be up to 32 bits) from one controller to the other and finally to the processing unit produces unnecessary overhead since all that is needed is the address of the default interrupt handler. Furthermore, in the above cases, the interrupt handling is inflexible with regard to any kind of (software based) interrupt vector generation.

The problem to be solved by the present invention therefore is to provide a data processing system and method for handling interrupt requests providing more flexibility without generating too much overhead.

Accordingly, a first aspect of the invention provides a data processing system comprising a first interrupt controller. The first interrupt controller comprises an interrupt source interface operable to receive interrupt requests generated by a first plurality of interrupt sources. It further comprises an interrupt controller interface couplable to an output of a second interrupt controller to receive a second single interrupt request, selected by the second interrupt controller at least among interrupt requests generated by a second plurality of interrupt sources, a second priority signal associated with said second selected interrupt request, and a second interrupt source index signal associated with the source of said second selected interrupt request. The first interrupt controller further comprises prioritizing means arranged to select among said interrupt requests generated by said first plurality of interrupt sources and said second selected interrupt request a first single interrupt request having highest priority. And the first interrupt controller further comprises a first interrupt controller output operable to provide said first selected interrupt request, a first priority signal associated with said first selected interrupt request, and a first index signal associated with the source of said first selected interrupt request. The data processing system further comprises a processing unit providing an interrupt controller interface couplable to said first interrupt controller output to receive the first selected interrupt request, the first priority signal, and the first index signal, said processing unit on the basis of said first index signal being operable to initiate an appropriate interrupt service routine.

By transmitting the interrupt priority and the index of the interrupt source, both between consecutive interrupt controllers in the daisy chain and between the first interrupt controller and the processing unit, it is possible to implement scalable cascaded interrupt architecture with small overhead. That is, only the necessary information is passed on, whereby, different means for generating interrupt vectors can be applied, such as software based generation of interrupt vectors, effecting a high degree of flexibility. When, for example, a software implementation of interrupt vector handling is desired the ID of the interrupt source may provide enough information to deduce the interrupt service routine to be called.

According to a second aspect of the invention which constitutes a further development of the first aspect, the data processing system further comprises a vector address selector coupled to a vector address table, whereby said processing unit provides an interface couplable to said vector address selector to request from said vector address selector an interrupt vector address on the basis of said first index signal.

According to a third aspect of the invention which constitutes a further development of the first aspect, the interrupt controller interface of said first interrupt controller is operable to receive a second interrupt controller identity provided by the second interrupt controller, said first interrupt controller output is operable to provide a first interrupt controller identity of that interrupt controller associated with the source of said first selected interrupt request, the interrupt controller interface of said processing unit is operable to receive the first interrupt controller identity, and said processing unit further on the basis of said first interrupt controller identity is operable to initiate said appropriate interrupt service routine.

Accordingly, an identification of the source of the selected highest priority interrupt request and hence of the appropriate interrupt service routine is enabled by the use of the index of the source itself in combination with the identity of the interrupt controller associated with the source. Doing so allows for more flexibility in identification handling and in some cases also less overhead.

According to a fourth aspect of the invention which constitutes a further development of the third aspect, the data processing system further comprises a vector address selector coupled to a vector address table, whereby said processing unit provides an interface couplable to said vector address selector to request from said vector address selector an interrupt vector address on basis of said first index signal and said first interrupt controller identity.

According to a fifth aspect of the invention which constitutes a further development of the second or fourth aspects, said vector address selector is integrated in the processing unit.

According to a sixth aspect of the invention which constitutes a further development of anyone of the first to fifth aspects, said processing unit on the basis of said first index signal or on the basis of said first index signal and said first interrupt controller identity being operable to determine an priority signal associated with said first selected interrupt request.

In this way, the flexibility of the interrupt handling can be enhanced since for each of the input interrupt sources there may be provided an associated priority level being programmable by the processing unit.

According to a seventh aspect said object is achieved by a method for handling interrupt requests, comprising receiving at an interrupt source interface interrupt requests generated by a first plurality of interrupt sources. Further, the method comprises receiving at an interrupt controller interface a second single interrupt request, selected at least among interrupt requests generated by a second plurality of interrupt sources, a second priority signal associated with said second selected interrupt request, and a second interrupt source index signal associated with the source of said second selected interrupt request. The method further comprises selecting among said interrupt requests generated by said first plurality of interrupt sources and said second selected interrupt request a first single interrupt request having highest priority. Further, the method comprises signaling via a first interrupt controller output said first selected interrupt request, a first priority signal associated with said first selected interrupt request, and a first index signal associated with the source of said first selected interrupt request to a processing unit. And the method comprises initiating an appropriate interrupt service routine on the basis of said first index signal.

Figure 2:
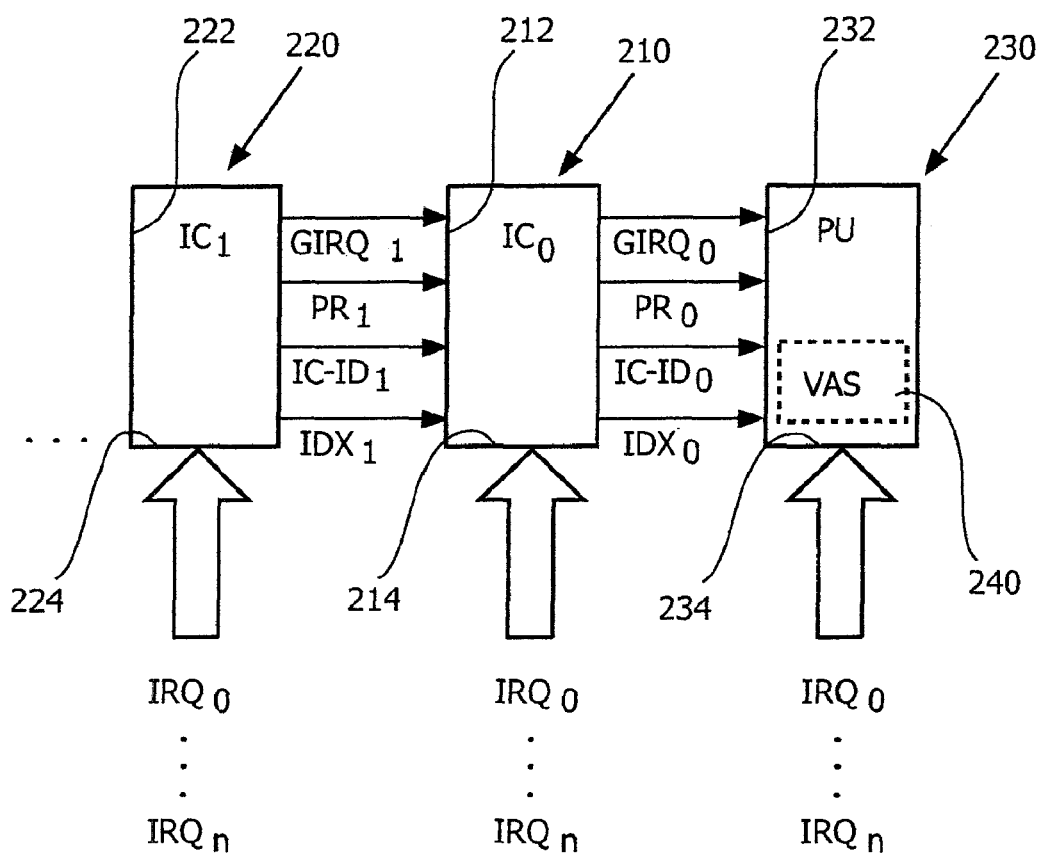
Figure 3:
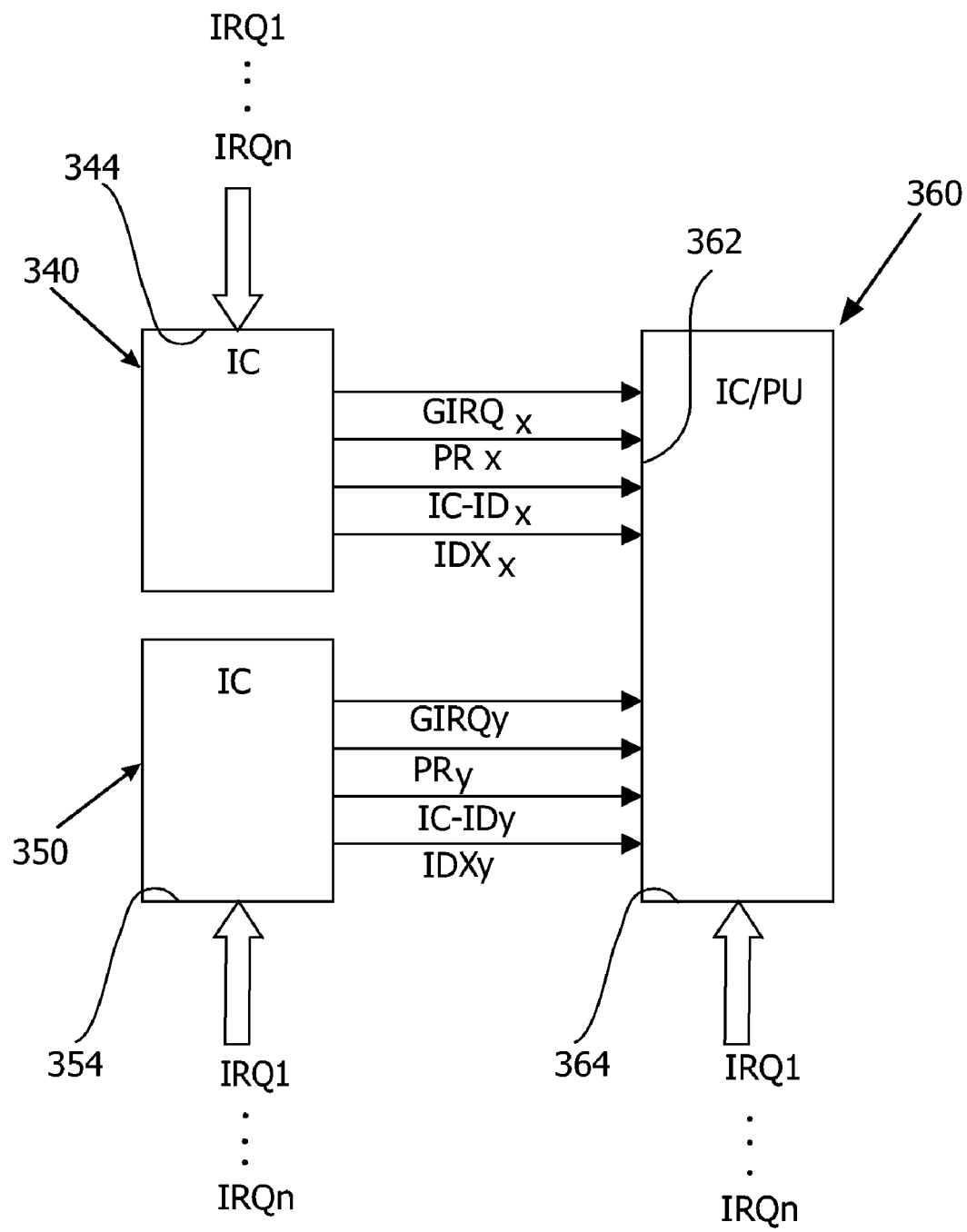

The above and other objects, features and advantages of the present invention will become apparent from the following description of preferred embodiments thereof taken in conjunction with the accompanying drawings in which:

FIG. 1 shows a block diagram of a data processing system according to a first embodiment of the invention comprising a cascaded interrupt controller arrangement; and FIG. 2 shows a block diagram of a data processing system according to a second embodiment of the invention; and FIG. 3 shows a block diagram of a data processing system according to a third embodiment of the invention.

The data processing system 100 according to the embodiment shown in FIG. 1 comprises a plurality of interrupt controllers 110 ($IC_0$), 120 ($IC_1$) arranged in a cascade. Further interrupt controllers are not shown but can be arranged in ascending order preceding interrupt controller 120 ($IC_1$). Each interrupt controller has an interrupt controller interface or daisy chain interface 112, 122. The interrupt controller interface of each interrupt controller is couplable to an output of the preceding interrupt controller. The interrupt controller interface 112 of the first interrupt controller 110, for example, is arranged to receive a second single selected interrupt request $GIRQ_1$ generated by the second interrupt controller 120.

For this purpose, second interrupt controller 120 selects the single interrupt request $GIRQ_1$ among interrupt requests $IRQ_0$ to $IRQ_n$ generated by a second plurality of interrupt sources (not shown) received by the second interrupt controller 120 via an interrupt source interface 124. If there are preceding interrupt controllers connected via interrupt controller interface 122 to the second interrupt controller 120 the selection of the second single interrupt request may be further based on respective third single selected interrupt requests input via said second interrupt controller interface 122.

Said first interrupt controller interface 112 is further arranged to receive a second priority signal $PR_1$ associated with said second selected interrupt request $GIRQ_1$. Moreover, a second interrupt source index signal $IDX_1$ associated with a source of said second selected interrupt request $GIRQ_1$ is transmitted via said first interrupt controller interface 112.

The first interrupt controller 110 further comprises a first interrupt source interface 114 operable to receive interrupt requests $IRQ_0$ to $IRQ_n$ generated by a first plurality of interrupt sources (not shown). Among these interrupt requests $IRQ_0$ to $IRQ_n$ generated by the first plurality of interrupt sources and the selected interrupt request $GIRQ_1$ received from the second interrupt controller 120 the first interrupt controller 110 selects by means of a prioritizing unit (not explicitly shown) a first single interrupt request $GIRQ_0$ based on the priority of the directly received interrupt request $IRQ_0$ to $IRQ_n$, and the priority $PR_1$ of the preceding selected interrupt request $GIRQ_1$.

The first selected interrupt request $GIRQ_0$ is transmitted via the first interrupt controller output to a processing unit 130 for further execution. Along with the first selected interrupt request $GIRQ_0$ the priority signal $PR_0$ associated with the selected interrupt request and a first index signal $IDX_0$ associated with the source of the first selected interrupt request is transmitted to the processing unit 130. The processing unit 130 therefore, provides also an interrupt controller interface 132 couplable to said first interrupt controller 110 and arrange to receive said signals. The processing unit 130 further provides an interrupt source interface 134 to receive direct interrupt requests from another plurality of interrupt sources $IRQ_0$ to $IRQ_n$. In alternative embodiments the latter interface could be omitted.

The data processing system 100 further comprises a vector address selector 140 (VAS) which is coupled to the processing unit 130 in order to transmit—on request—a dedicated vector address (VA) to the processing unit 130. For request the processing unit 130 forwards the first index signal $IDX_0$ received from the first interrupt controller 110. Hence, on the basis of said first index signal $IDX_0$ the processing unit 130 is operable to initiate an appropriate interrupt service routine.

By providing a unique interrupt controller interface both for the interrupt controllers and for the processing unit the implementation of the data processing system is very simple and easily scalable. However, care should be taken that the interrupt source index signal $IDX_0$, $IDX_1$, ... can be unambiguously associated with the interrupt source sending the highest priority interrupt request in order to provide the appropriate interrupt service routine. That requires that either each source index is assigned once only or that the source index being, for example, determined by the port of the allocated interrupt controller has to be combined with an identification of the respective interrupt controller.

In FIG. 2 a modified embodiment of the data processing system according to the present invention is shown. Compared to the embodiment of FIG. 1 the interrupt controllers 210 ($IC_0$) and 220 ($IC_1$) are further adapted to provide and to receive an interrupt controller identity IC-$ID_0$, IC-$ID_1$, respectively. The interrupt controller identity serves for identifying that interrupt controller which is associated with the interrupt source generating the interrupt request having highest priority and therefore being selected. Hence, IC-$ID_0$, for example, does not necessarily indicate the first interrupt controller $IC_0$ 210 but rather that interrupt controller which is associated with the highest priority interrupt request. Consequently, each interrupt controller 210, 220 is arranged to provide at its output the identify of that interrupt controller which is associated with the source of the accordingly selected interrupt request. In particular, said first interrupt controller interface 212 is operable to receive a second interrupt controller identity IC-$ID_1$ provided by the second interrupt controller 220 ($IC_1$). The first interrupt controller output is operable to provide a first interrupt controller identity IC-$ID_0$ indexing that interrupt controller associated with the source of the first selected interrupt request $GIRQ_0$ generated in the manner described above.

Accordingly, the interrupt controller interface 232 of the processing unit 230 is operable to receive the first interrupt controller identity IC-$ID_0$. The processing unit is operable to initiate the appropriate interrupt service routine on the basis of the first index signal $IDX_0$ in combination with the first interrupt controller identity IC-$ID_0$.

As a second difference compared to the first embodiment, the data processing system according to FIG. 2 comprises a processing unit with an integrated vector address selector 240 (VAS). In this case, the functionality of mapping the first index signal $IDX_0$ and the first interrupt controller identity IC-$ID_0$ and the appropriate interrupt service routine is completely effected by the processing unit 230. The vector address selection can be effectively implemented in hardware and/or in software in order to make the mapping flexible.

In FIG. 3 instead of a mere in-line arrangement between interrupt controllers and the processing unit a partially parallel arrangement of succeeding elements is shown. Interrupt controllers 340 and 350 each connected to a plurality of interrupt sources via an interrupt source interfaces 344, 354, respectively, are arranged in parallel and connected via interrupt controller interface 362 to the next level element 360. The next level element 360 as well comprises an interrupt source interfaces 364 for connecting another plurality of interrupt sources. The next level element 360 may be another interrupt controller or the processing unit. In other words, in a the data processing system according to the present invention such a parallel arrangement of interrupt controllers, in principle, can be introduced at any level of the cascade, provided that the next level element (interrupt controller or processing unit) comprises sufficient connectivity, i.e. at least two interrupt controller interfaces. Furthermore, several of these parallel arrangements can be introduced consecutively so that a pyramid of interrupt controllers will be built having the processing unit on top. These kinds of parallel arrangement will effectively reduce the interrupt service latency compared to simple cascaded arrangement.

In known manner any of the interrupt controllers in the daisy chain may comprise masking means arranged to suppress the interrupt controller output to provide any interrupt requests and associated priority and index signals having a priority lower than a highest priority interrupt currently accepted by the processing unit.

It should be noted that the above mentioned embodiments illustrate rather than limit the invention and that those skilled in the art will be able to design many alternative embodiments without departing from the scope of the appended claims. In the claims any reference signs placed between parenthesis shall not be construed as limiting the claim. The word "comprising" does not exclude the presence of elements or steps other than those listed in the claims. The word "a" or "an" preceding an element does not exclude the presence of plurality of such elements. In the device claims numerating several means, several of these means can be embodied by one and the same item of hardware. The mere effect that certain measures are recited in mutually different dependent claims does not indicate that a combination of these measures cannot be used to advantage.

The invention claimed is:

1. A data processing system, comprising:
   a first interrupt controller, comprising:
      an interrupt source interface operable to receive interrupt requests generated by a first plurality of interrupt sources;
      an interrupt controller interface couplable to an output of a second interrupt controller to receive a second single interrupt request, selected by the second interrupt controller at least among interrupt requests generated by a second plurality of interrupt sources, a second priority signal associated with said selected second interrupt request, and a second interrupt source index signal associated with the source of said selected second interrupt request;
      prioritizing means arranged to select among said interrupt requests generated by said first plurality of interrupt sources and said selected second interrupt request, a first single interrupt request having highest priority;
      a first interrupt controller output operable to provide said selected first interrupt request;
      a first priority signal associated with said selected first interrupt request;
      a first index signal associated with the source of said selected first interrupt request; and
      a processing unit providing an interrupt controller interface couplable to said first interrupt controller output to receive the selected first interrupt request, the first priority signal, and the first index signal, said processing unit on a basis of said first index signal being operable to initiate an appropriate interrupt service routine.

2. The data processing system according to claim 1, comprising a vector address selector coupled to a vector address table, whereby said processing unit provides an interface couplable to said vector address selector to request from said vector address selector an interrupt vector address on a basis of said first index signal.

3. The data processing system according to claim 2, wherein said vector address selector is integrated in the processing unit.

4. The data processing system according to claim 1, wherein the interrupt controller interface of said first interrupt controller is operable to receive a second interrupt controller identity provided by the second interrupt controller, said first interrupt controller output is operable to provide a first interrupt controller identity of the first interrupt controller associated with the source of said selected first interrupt request, the interrupt controller interface of said processing unit is operable to receive the first interrupt controller identity, and said processing unit further on a basis of said first interrupt controller identity is operable to initiate said appropriate interrupt service routine.

5. The data processing system according to claim 4, comprising a vector address selector coupled to a vector address table, whereby said processing unit provides an interface couplable to said vector address selector to request from said vector address selector an interrupt vector address on a basis of said first index signal and said first interrupt controller identity.

6. The data processing system according to claim 4, wherein said processing unit, on a basis of said first index signal or on a basis of said first index signal and said first interrupt controller identity, is operable to determine a priority signal associated with said selected first interrupt request.

7. The data processing system of claim 1, wherein a plurality of interrupt controllers are arranged in pyramid, and wherein the processing unit is at a top of the pyramid.

8. A method for handling interrupt requests, comprising the acts of:
   receiving at an interrupt source interface interrupt requests generated by a first plurality of interrupt sources;
   receiving at an interrupt controller interface a second single interrupt request, selected at least among interrupt requests generated by a second plurality of interrupt sources, a second priority signal associated with said selected second interrupt request, and a second interrupt source index signal associated with the source of said selected second interrupt request;
   selecting among said interrupt requests generated by said first plurality of interrupt sources and said selected second interrupt requests a first single interrupt request having highest priority;
   signaling via a first interrupt controller output said first selected interrupt request, a first priority signal associated with said selected first interrupt request, and a first index signal associated with the source of said first selected interrupt request to a processing unit; and
   initiating an appropriate interrupt service routine on a basis of said first index signal.

9. The method according to claim 8, further comprising the act of requesting on a basis of said first index signal from a vector address selector an interrupt vector address in order to initiate said appropriate interrupt service routine.

10. The method according to claim 8, further comprising the acts of:
   receiving at said interrupt controller interface a second interrupt controller identity;
   signaling via said first interrupt controller output to said processing unit a first interrupt controller identity of a first interrupt controller associated with the source of said selected first interrupt request;
   initiate said appropriate interrupt service routine further on a basis of said first interrupt controller identity.

11. The method according to claim 10, further comprising the act of requesting on a basis of said first index signal and said first interrupt controller identity an interrupt vector address in order to initiate said appropriate interrupt service routine.

12. The method of claim 8, further comprising the acts of:
   arranging a plurality of interrupt controllers in pyramid; and
   arranging the processing unit at a top of the pyramid.

* * * * *